United States Patent
Vergote

(10) Patent No.: US 10,433,489 B2
(45) Date of Patent: Oct. 8, 2019

(54) SAFE KNOTTER FOR AN AGRICULTURAL BALER

(71) Applicant: CNH Industrial America LLC, New Holland, PA (US)

(72) Inventor: Stijn Vergote, Tielt (BE)

(73) Assignee: CNH Industrial America LLC, New Holland, PA (US)

( * ) Notice: Subject to any disclaimer, the term of this patent is extended or adjusted under 35 U.S.C. 154(b) by 40 days.

(21) Appl. No.: 14/372,688

(22) PCT Filed: Jan. 15, 2013

(86) PCT No.: PCT/EP2013/050616
§ 371 (c)(1),
(2) Date: Jul. 16, 2014

(87) PCT Pub. No.: WO2013/107718
PCT Pub. Date: Jul. 25, 2013

(65) Prior Publication Data
US 2014/0367965 A1    Dec. 18, 2014

(30) Foreign Application Priority Data

Jan. 16, 2012  (BE) .................................. 2012/0039

(51) Int. Cl.
*A01F 15/14*   (2006.01)
*A01F 15/08*   (2006.01)
*A01F 21/00*   (2006.01)

(52) U.S. Cl.
CPC ........ *A01F 15/145* (2013.01); *A01F 15/0858* (2013.01); *A01F 15/14* (2013.01); *A01F 21/00* (2013.01)

(58) Field of Classification Search
CPC .... A01F 15/145; A01F 15/0858; A01F 21/00; A01F 15/14; B65H 2407/32;
(Continued)

(56) References Cited

U.S. PATENT DOCUMENTS 3,804,003 A *  4/1974  Hehl .................... B22D 17/26
                                                    100/343
4,142,746 A    3/1979  White
(Continued)

FOREIGN PATENT DOCUMENTS

AT    223947 B     10/1962
DE    112320 A1    4/1975
(Continued)

OTHER PUBLICATIONS

English translation of DE 10154456, https://patentscope.wipo.int/search/en/detail.jsf?docId=DE103573552&recNum=1&maxRec=&office=&prevFilter=&sortOption=& queryString=&tab=PCTDescription.*

*Primary Examiner* — Sally Haden
*Assistant Examiner* — Jillian K Pierorazio
(74) *Attorney, Agent, or Firm* — Patrick M. Sheldrake; Peter K. Zacharias

(57) ABSTRACT

A knotter for a baler, the knotter including a knotting system with at least one movable part, and a driver, operatively connected to the at least one movable part. The knotter is further provided with a first cover, associated with at least one movable part, having a first covering position wherein the first cover at least partly covers the at least one movable part, and a second uncovering position, wherein the first cover no longer covers the at least one movable part. The knotter further includes a safety mechanism, operatively connected to the driver and the first cover, such that positioning or enabling the positioning of the first cover in the second uncovering position stops the moving of the at least one movable part.

17 Claims, 8 Drawing Sheets

(58) Field of Classification Search
CPC ........ A01D 59/04; A01D 59/06; H01H 21/04; H01H 21/06; H01H 9/226
USPC ...... 289/5, 2, 16, 6, 10; 220/254.6; 100/349, 100/341; 200/61.69
See application file for complete search history.

(56) References Cited

U.S. PATENT DOCUMENTS

| | | | |
|---|---|---|---|
| 5,058,495 | A | 10/1991 | Van Den Bossche et al. |
| 5,181,368 | A * | 1/1993 | Anstey ................ A01F 15/0715 242/422.5 |
| 6,038,125 | A * | 3/2000 | Anzai .................. H05K 5/0208 174/660 |
| 6,338,192 | B1 * | 1/2002 | Kanai ........................ F16P 3/08 29/706 |
| 6,742,448 | B1 * | 6/2004 | Davis .................... B30B 9/3007 100/229 A |
| 7,878,557 | B2 | 2/2011 | Eylenbosch et al. |
| 8,381,927 | B2 * | 2/2013 | Nam .................... B65D 90/008 16/78 |
| 8,517,158 | B2 | 8/2013 | Viaud |
| 2007/0066375 | A1 * | 3/2007 | Ho ........................ A01D 46/084 460/119 |
| 2007/0145189 | A1 * | 6/2007 | Martinez Rueda ... B64C 1/1407 244/129.4 |
| 2012/0204742 | A1 * | 8/2012 | Van Vooren ........ A01F 15/0841 100/349 |

FOREIGN PATENT DOCUMENTS

| | | | |
|---|---|---|---|
| DE | 112330 A | 4/1975 | |
| DE | 10154456 A1 * | 7/2003 | ......... A01D 41/1261 |

* cited by examiner

SAFE KNOTTER FOR AN AGRICULTURAL BALER

This application is the US National Stage filing of International Application Serial No. PCT/EP2013/050616 filed on Jan. 15, 2013 which claims priority to Belgian Application No. BE2012/0039 filed Jan. 16, 2012, each of which is incorporated herein by reference in its entirety.

FIELD OF THE INVENTION

The present invention generally relates to knotters for use with agricultural balers for creating bales of agricultural crop material. More particularly, the present invention relates to knotters, especially designed for operator safety. The present invention also relates to balers provided with a knotter such that the balers feature an improved operator safety.

BACKGROUND OF THE INVENTION

An agricultural baler is a trailed machine (PTM—pulled type machine) used in agriculture for the purpose of creating bales of (typically) straw or other biomass such as hay, silage or similar crop material produced during a harvesting or mowing operation.

Knotters are used for binding bales of harvested crop material or other substances, so that bales may be handled, stored or otherwise manipulated without breaking apart. Knotters are therefore used to tie at least one and typically several strands of binding material such as twine or any other suitable type of lineal object around the bales, and to bind it in a manner that leads to a satisfactory knot. These knotters have a knotting system with at least one movable part. The movable part can e.g. be the needles and/or needle yokes. More detailed descriptions of knotters are found in U.S. Pat. No. 4,142,746, EP2108247, EP0426905. In essence the movable part is used to arrange the lineal object around the bale at the moment the bale has reached a predetermined desired length. This movement is arranged by a driver, operatively connected to the at least one movable part. The driver for example has a control means (e.g. a trip mechanism), controlling the operations of the knotting system by allowing the moving of the one or more movable parts of the knotting system when the bale reaches a desired length for binding by the knotting system.

It is clear that moving parts in a machine are always dangerous for operators, for example when such operators come near to those moving parts for maintenance, especially when the movement of such parts is not continuous but is conditional, as in the case of a knotter where the binding only starts when the bale has a predetermined desired length. In general such knotters may have no or insufficient coverage of their moving parts. Even in realizations with covers (even when such covers are manually locked), as for example in DD112320, the safety problem remains when the operator opens such cover and approaches the moving parts for maintenance work. In particular in the system described in DD112320, means are provided for preventing an operator to open a cover while the needles are present in the baling chamber; however, nothing prevents the operator to open the cover before the bale has reached its predetermined length, after which the needles can still move into the baling chamber, thus potentially hurting or injuring the operator.

The need for increasing operator safety is addressed in standardization efforts by emphasizing better coverage of moving parts in the knotter area.

Hence there is room for good knotter devices, for example balers provided with such knotter devices, showing improved operator safety.

SUMMARY OF THE INVENTION

It is an object of embodiments of the present invention to provide knotters which have a good, for example substantially improved, operator safety while keeping the manufacturing costs of such machine under control.

The above objective is accomplished by a knotter according to embodiments of the present invention.

In a first aspect of the invention a knotter for an agricultural baler is provided. The knotter comprises a knotting system with at least one movable part, adapted for moving while binding a bale, and a driver, operatively connected to the at least one movable part, for arranging its movement. The knotter is further provided with a first cover, associated with at least one movable part, the first cover having a first covering position wherein the first cover at least partly covers the at least one movable part it is associated with, and a second uncovering position, wherein the first cover no longer covers the at least one movable part it is associated with. The knotter is further characterized in that it comprises a safety means, operatively connected to the driver of the at least one movable part and the first cover, such that positioning of or enabling the positioning of the first cover in the second uncovering position stops the moving of the at least one movable part, associated with the first cover.

In embodiments of the present invention the knotter has its first cover covering all movable parts of the knotting system.

In embodiments of the present invention the knotter comprises a second cover and a second movable part, wherein the first cover is associated with a first movable part and the second cover is associated with the second movable part. The second cover also has a first covering position wherein the second cover at least partly covers the second movable part it is associated with, and a second uncovering position, wherein the second cover no longer covers the second movable part. In this embodiment of the invention the knotter is further characterized in that the first and the second cover are arranged with respect to each other such that the second cover can only be placed in its second uncovering position when the first cover is placed in its uncovering position, whereby the safety means is further operatively connected also to the drive mechanism of the second movable part, such that positioning of or enabling the positioning of the first cover in the second uncovering position already stops the moving of the second movable part.

A knotter according to embodiments of the present invention may be provided with a driver comprising a control means for controlling operations of the knotting system by allowing the moving of the one or more movable parts of the knotting system when the bale being formed has reached a predetermined desired length for binding by the knotting system. The safety means stops the movement of the one or more movable parts when the first cover is going or is enabled to go in its second uncovering position, by interrupting the control means.

The driver of a knotter according to alternative embodiments of the present invention may comprise a rotatable shaft for providing the power for moving the one or more movable parts. The safety means stops the movement of the one or more movable parts when the first cover is brought into or is enabled to go in its second uncovering position, by disconnecting the rotatable shaft from the one or more movable parts.

The safety means of a knotter according to embodiments of the present invention may be a mechanical means with a first locked position which disables movement of the first cover from its first covering position but allows normal operation of the driver, and a second unlocked position, allowing the first cover to move from the first covering position to the second uncovering position but simultaneously interferes in the operation of the driver such that the one or more movable parts, connected thereto, stop moving.

The mechanical means may comprise a handle, connected to a slide lever for locking the first cover in its covering position, and a locking means for locking the driver, the locking means also being connected to the handle.

In another embodiment of the present invention, the safety means of a knotter comprises a sensor for sensing a change of the first cover between its positions, and actuators, steered by the sensor, operatively connected to the driver.

In a second aspect of the invention a baler is provided, the baler comprising a bale chamber and a knotter as in the first aspect of the invention attached to the bale chamber.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which.

Figure 1:
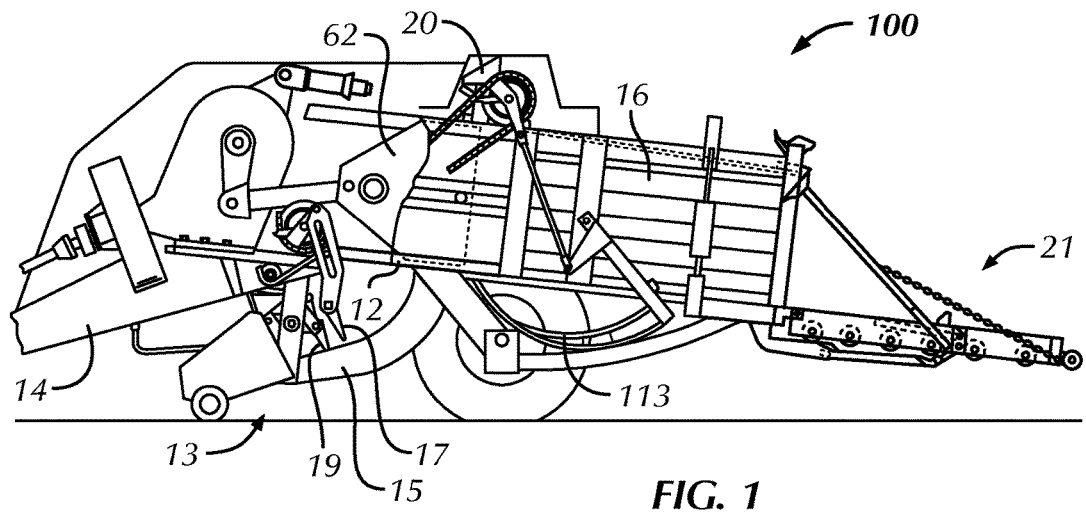
FIG. 1 is a schematic, vertically sectioned view of a typical rectangular agricultural baler.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF THE INVENTION

The present invention will be described with respect to particular embodiments and with reference to certain drawings but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to crop material, reference is made to any suitable type of biomass that can be harvested and packed in bales, such as for example hay, silage, straw or other.

Where in embodiments of the present invention reference is made to agricultural balers, reference is made to machines for forming bales from agricultural crop material, such as forming cuboid shaped bales by any suitable means. An example of such an agricultural baler is illustrated in FIG. 1. FIG. 1 shows a prior art agricultural baler 100 comprising a frame 12 which is equipped with a forwardly extending tongue 14 at its front end with hitch means (not shown) for coupling the baler 100 to a towing tractor. A pick-up assembly 13 lifts windrowed crop material off the field as the baler 100 is travelled thereover and delivers such material into the front end of a rearwardly and upwardly curved, charge-forming feeder duct 15. The duct 15 communicates at its upper end with an overhead, fore-and-aft extending bale-forming chamber 16 into which crop charges are loaded by a cyclically operating stuffer mechanism 17. A continuously operating packer mechanism 19 at the lower front end of the feeder duct 15 continuously feeds and packs material into the duct 15 as to cause charges of the crop material to take on and assume the internal configuration of the duct 15 prior to periodic engagement by the stuffer 17 and insertion up into the bale-forming chamber 16. The feeder duct 15 may be equipped with means (not illustrated) for establishing whether a complete charge has been formed therein and operating the stuffer mechanism 17 in response thereto. Each action of the stuffer mechanism 17 introduces a "charge" or "flake" of crop material from the duct 15 into the chamber 16.

A plunger 62 reciprocates in a fore-and-aft direction within the bale-forming chamber 16. Biomass fed via the feeder duct 15 is thereby compacted, e.g. compressed or otherwise treated, so as to form bales in the above-described operation of the agricultural baler 100. Cuboid shaped bales are formed. The completed bales are tied with twine or a similar lineal object to make them self-supporting, for example for shipping and storage. Once tied, the bales are discharged from the rear end of the bale-forming chamber 16 onto a discharge in the form of a chute, generally designated 21.

Figure 2:
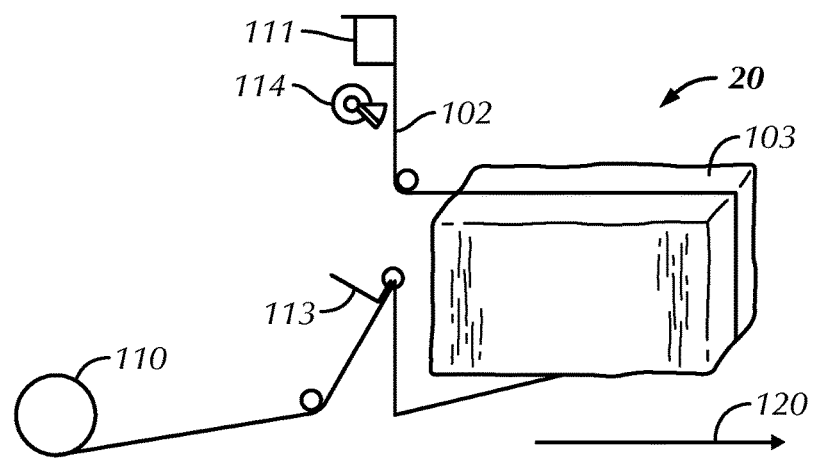
FIG. 2 schematically illustrates the knotting process of an agricultural baler.

For tying the bales, at least one knotter 20 for automatically tying the bales of crop material, illustrated in more detail in FIG. 2, is provided on the baler 100 for each guiding a lineal object 102 around a bale 103 and forming a closed loop in the lineal object 102 encircling the bale 103, for example by tying, stapling or crimping. In accordance with embodiments of the present invention (not illustrated in the drawings), a knotter system may be provided, comprising a plurality of knotters 20 which operate substantially simultaneously, such that a bale 103 is tied with a plurality of lineal objects 102.

A knotter 20 can be implemented as known in the art, and may for example comprise at least one source of lineal object 102, e.g. at least one twine supply roll 110, a lineal object holder 111 for holding one end of the lineal object 102, a cutter 114 for cutting the lineal object 102 and a needle 113, for example implemented as a reciprocating inserter arm, also called needle, for bringing another piece, e.g. end, of the lineal object 102 towards the end held by the lineal object holder 111, for securing the lineal object 102 to itself so as to make a loop. As illustrated in FIG. 1, the needle 113 is mounted on the baler frame 12 and may be swung back and forth across the bale-forming chamber 16 when activated. The needle 113 has an "at-home" or rest position fully below the bale-forming chamber 16 and a "full-throw" position extended completely across the bale-forming chamber 16. The tip of the needle 113 may have an eyelet defined therein for holding the lineal object 102.

Figure 3:
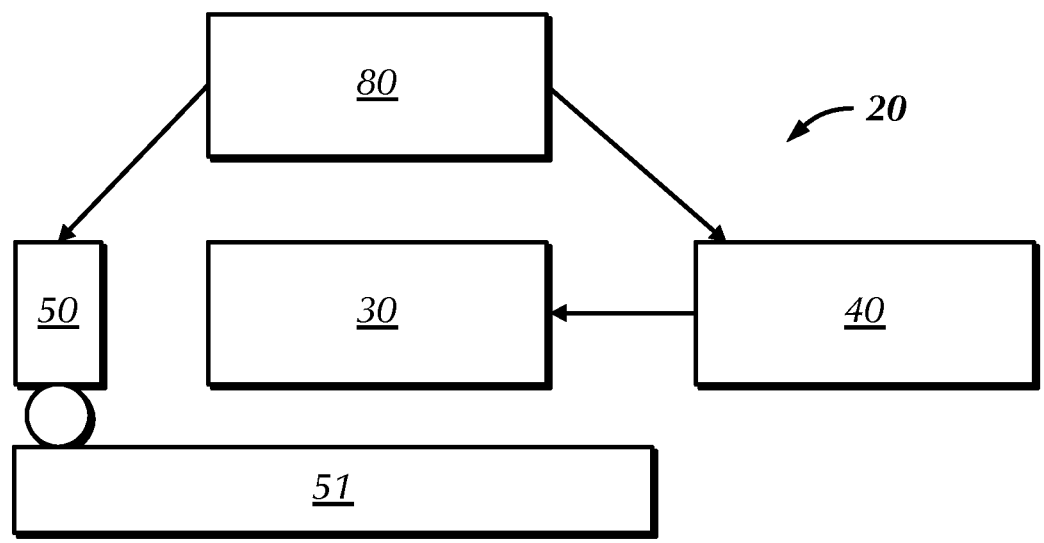
FIG. 3 schematically shows a knotter in accordance with a first embodiment of the present invention for use with an agricultural baler.

The knotter system illustrated as an illustrative embodiment in FIG. 2 has a single lineal object, e.g. twine supply roll 110 at the bottom side of the system. In alternative implementations, in case of a single knotter, such supply roll 110 may be provided at the top side of the system. In alternative embodiments, for example in case of a double knotter as illustrated in FIG. 3, supply rolls 110 may be provided both at the top and at the bottom side of the system.

In the example illustrated, the lineal object, e.g. twine, holder 111 retains one end of lineal object, e.g. a strand of twine, and the needle 113 pulls this strand between the abutting ends of a previous bale (not illustrated) and the one which is to be packed. As the bale 103 being packed is pushed along a bale displacement direction 120, for example through a bale-forming chamber 16 of the baler 100 or along a discharge at the outlet end of such chamber 16, it pushes against the strand of twine held between the lineal object holder 111 and the needle 113, causing the lineal object 102 to elongate, for example by unrolling from the supply roll 110, as illustrated in FIG. 2.

When the end of the bale 103 being packed is reached, as illustrated in FIG. 2, the needle 113 pulls the strand back toward the lineal object holder 111 along the abutting end of the bale 103, for example by swinging the needle 113 through the bale-forming chamber 116. The needle 113 takes the lineal object 102 with it towards either the other end of the lineal object 102 (single knotter), or towards another piece of lineal object 102 (double knotter). One knot (single knotter) or two subsequent knots (double knotter) may be made e.g. with a knotting mechanism tying both ends of the strand together, after which the lineal object 102 may be cut by means of a cutter 114, either behind the single knot, or in between the two knots.

The knotter 20 illustrated in FIG. 2 is a knotter involving a single loop of lineal object 102. Also more complex knotter configurations are known in the art, involving for example multiple strands of lineal object adjacent one another, or banding material being crimped instead of twine. Where in embodiments of the present invention reference is made to knotters, reference is made to any tying devices adapted for baling processes, i.e. for the use in agricultural balers. These include, but are not limited to, devices for knotting, twisting, stapling or crimping of any suitable lineal object, such as e.g. wire, twine or banding, for the purpose of packing a bale of crop material with said lineal object.

As illustrated in FIG. 3, embodiments of the present invention provide a knotter 20 for a baler 100, comprising a knotting system with at least one movable part 30. The at least one movable part 30 can e.g. comprise the needle yokes or the needles 113, and is moving while binding the bale 103. The knotter 20 furthermore comprises a driver 40, operatively connected to the at least one movable part 30, for arranging the movement thereof; a first cover 50, associated with the at least one movable part 30, the first cover being pivotably connected to a knotter frame 51. This first cover 50 has a first covering position wherein the first cover 50 at least partly covers the at least one movable part 30 it is associated with, and a second uncovering position, wherein the first cover 50 no longer covers the at least one movable part 30 it is associated with. With "covering" is meant "sufficiently preventing (human) operators to get in the neighborhood of the at least one movable part 30", more in particular in the area reachable by the at least one movable part while moving. With "uncovered" is meant that the cover 50 with respect to the at least one movable part 30 is arranged so that at least the operator can service this at least one movable part 30. The knotter 20 further comprises a safety means 80, operatively connected to the driver 40 of the at least one movable part 30 and to the first cover 50, such that positioning the first cover 50 in the second uncovering position stops or prevents or locks the moving of the at least one movable part 30, associated with the first cover 50.

It is to be noted that the safety means 80 is not necessarily a single device or a device located at a single position, but may be an assembly of parts, e.g. an assembly of co-operating parts. The safety means 80 might comprise several devices even of a different nature (mechanical, electronic, hydraulic, pneumatic), whereby each of its devices might be located at different places in the knotter 20 (e.g. sensors close to the covers 50 that need to be monitored, actuators close to the devices they might need to actuate, e.g. close to the trip mechanism, or close to the drive coupling). Indeed, given the distributed nature of the problem tackled here, being acting when an operating condition occurs that might jeopardize operator safety, which is monitored at one place (the cover's side) but is cured at another place in the knotter 20 (preventing the moving of the at least one movable part 30), the safety means 80 may show a distributed nature even when entirely realized in mechanical form (e.g. use of a handle with shafts, reaching out to the cover 50 and to the knotting system area). In accordance with embodiments of the present invention, also in a realization with a sensor (at cover side) and an actuator (at knotting system side) set-up communications (wired or even wireless) will be available.

It is to be noted that the safety means 80 is not necessarily a passive device, meaning a device adapted for acting only when an event occurs. Although such embodiments form part of the present invention (e.g. a sense and actuate realization), also active embodiments wherein the operator actually sets the mode of working (either knotting allowed but with closed cover 50, or knotting disallowed but opening cover 50 possible) is feasible (e.g. the use of a mechanical handle but then linked to both the cover 50 and the knotting system.).

In embodiments of the present invention, the cover 50 can be brought in its uncovering position independently of the twine box cover(s) 52. Alternatively, the cover 50 for covering the at least one moveable part such as for example the needle yokes or the needles 113, and the twine box cover 52 can be made in a single piece, so that bringing the cover 50 in its uncovering position at the same time brings the twine box cover 52 in its uncovering position.

Based on the designer choice two approaches can be followed: in one approach the safety means 80 only act when the cover 50 goes in its unsafe uncovering position (e.g. a sensor-actuator embodiment can be used to realize this). In a second approach the safety means 80 acts even earlier in that it prevents/stops/blocks the moving parts 30 from moving even when the first cover 50 is brought in a condition where it is enabled to go into its unsafe position (e.g. because a lock providing this is opened). This second approach can for example be implemented in a mechanical fashion. Alternatively formulated the safety means 80 or device may be designed such that it prevents the knotter 20 from working, hence it blocks the knotter functionality when the operator safety might be jeopardized, which is either when the cover 50 goes in its unsafe uncovering position or when the cover 50 is enabled to go in its unsafe uncovering position.

For the applicability of the invention it does not matter how many movable parts the knotter might have and how such movable parts are covered (e.g. each with one or more covers, e.g. one for every side of it). It is a machine designer's choice to decide on the safety level of the machine by providing one or more covers, up to covering all moving parts. In any case the machine design can benefit from the invention by allowing it to intervene upon multiple unsafe conditions. Therefore, in embodiments of the present invention, the safety means 80 or device is arranged to act as soon as one of the knotter covers or access panels to the knotter area within the knotter 20 is opened. In accordance with other embodiments of the present invention the safety means 80 or device is arranged to act if one of the knotter safety covers or access panels to the knotter area within the knotter is opened. With "knotter safety covers" is meant here, those covers that when opened might jeopardize the operator safety. While such multiple condition realization can be made by actually placing a set of parallel safety means, in a more economic fashion re-use of the entire blocking mechanism is also feasible. Only duplication on the side of the covers (e.g. having multiple sensors) is needed then and providing an element with a logic OR-functionality. It is to be noted that the movable parts 30 do not necessarily have the same driver, control means or means for driving power to it. In such case the safety means 80 will be arranged to provide separate signals to such means for each of the movable parts to lock, block or stop the moving operation.

In an alternative embodiment, instead of duplicating the safety set-up or at least parts thereof, for a multi-cover arrangement, an arrangement of covers may be provided, wherein both a first and/or a second cover are pivotably connected to a knotter frame. When the knotting system comprises at least two movable parts, a first cover gets associated with a first movable part and a second cover gets associated with a second movable part. The second cover also has then a first covering position wherein the second cover at least partly covers the second movable part it is associated with, and a second uncovering position, wherein the second cover no longer covers the second movable part. The first and the second covers are may be arranged with respect to each other such that the second cover can only be placed in its second uncovering part when the first cover is placed in its uncovering position, whereby the safety means is further operatively connected also to the drive mechanism of the second movable part, such that positioning the first cover in the second uncovering position already stops the moving of the second movable part.

Figure 4:
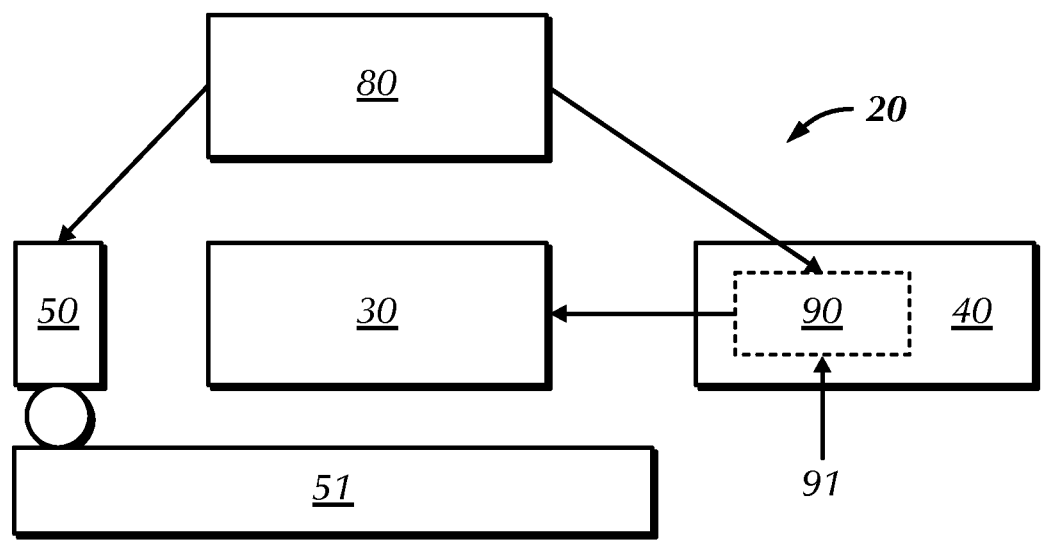
FIG. 4 schematically shows a knotter in accordance with a second embodiment of the present invention for use with an agricultural baler.

In embodiments of the present invention, as illustrated in FIG. 4, the driver 40 comprises a control means 90 for controlling the operations of the knotting system by allowing the moving of the one or more movable parts 30 of the knotting system when the bale 103 reaches a desired length for being bound by the knotting system. Hereto, the control means 90 may be adapted for receiving status information 91 from the bale formation process, such as e.g. bale length information, and may be adapted for, based on this status information, controlling the actual movement of the at least one movable part 30. In this embodiment, the safety means 80 may be linked to the control means 90 and to the cover 50. The safety means 80 may be adapted for stopping the movement of the one or more movable parts 30 when the first cover 50 is in its second uncovering position by interrupting the control means 90. In one embodiment thereof the blocking is realized by preventing the trip mechanism from tripping.

Figure 5:
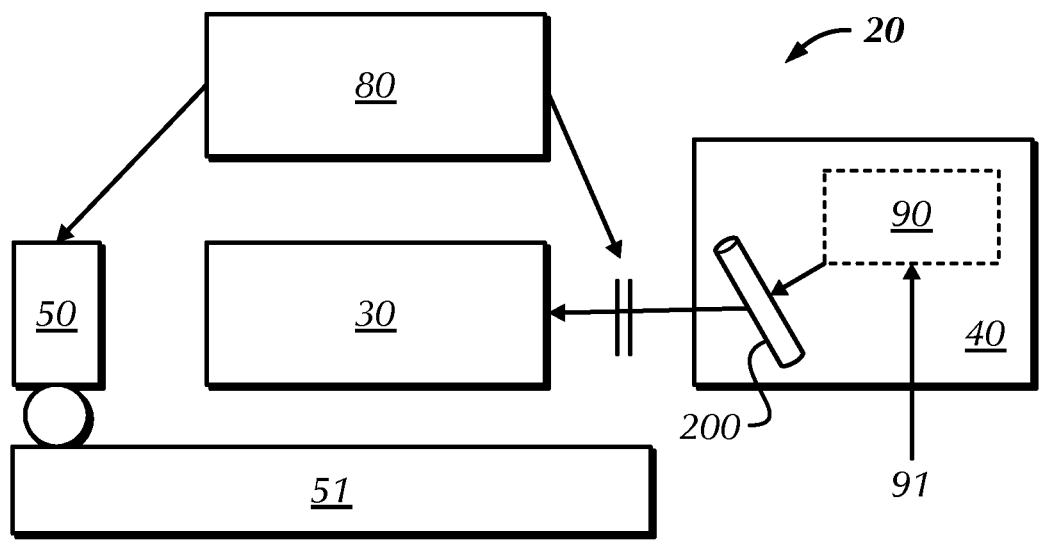
FIG. 5 schematically shows a knotter in accordance with a third embodiment of the present invention for use with an agricultural baler.

In an alternative embodiment of the present invention, as illustrated in FIG. 5, the driver 40 comprises a rotatable shaft 200 for providing the power for moving the one or more movable parts 30. The rotatable shaft 200 may be driven by the motor of the vehicle pulling the entire baler 100 including the knotter. The rotatable shaft then provides the power to enable movement of the at least one movable part 30, when so requested by the control means 90. A means may be provided for disconnecting the rotatable shaft 200 from the at least one movable part 30. In this embodiment, the safety means 80 may be adapted for stopping the movement of the one or more movable parts 30 when the first cover 50 is in its second uncovering position, by disconnecting the rotating shaft 200 from the one or more movable parts 30.

The control means interrupting embodiment of FIG. 4 and the power disconnect embodiment of FIG. 5 can also be used together in order to reach a higher degree of safety, e.g. in case of failure of one of the mechanisms (redundancy).

Based on the design complexity of the knotter 20 (amount and distribution of movable parts 30, access to the drive lines, the possibility of having one or more covers and their relative positioning) a design according to embodiments of the present invention might select any possible combination of the above proposed arrangements (multi-mutually blocking covers, control means interrupt, power disconnect embodiment).

In an embodiment of the invention the safety means 80 is a mechanical means with a first locked position which disables movement of the first cover from its first covering position but allows normal operation of the driver, and a second unlocked position, allowing the first cover 50 to move from the first covering position to the second uncovering position, but simultaneously interferes with the operation of the driver 40 such that the one or more movable parts 30, connected thereto, stop moving. In an embodiment thereof the mechanical means comprises a handle, connected to a slide lever that locks the first cover in its covering position, and a means locking the driver, the locking means also being connected to the handle. This embodiment is further illustrated in FIG. 6 to FIG. 13, and described with reference thereto.

Figure 6:
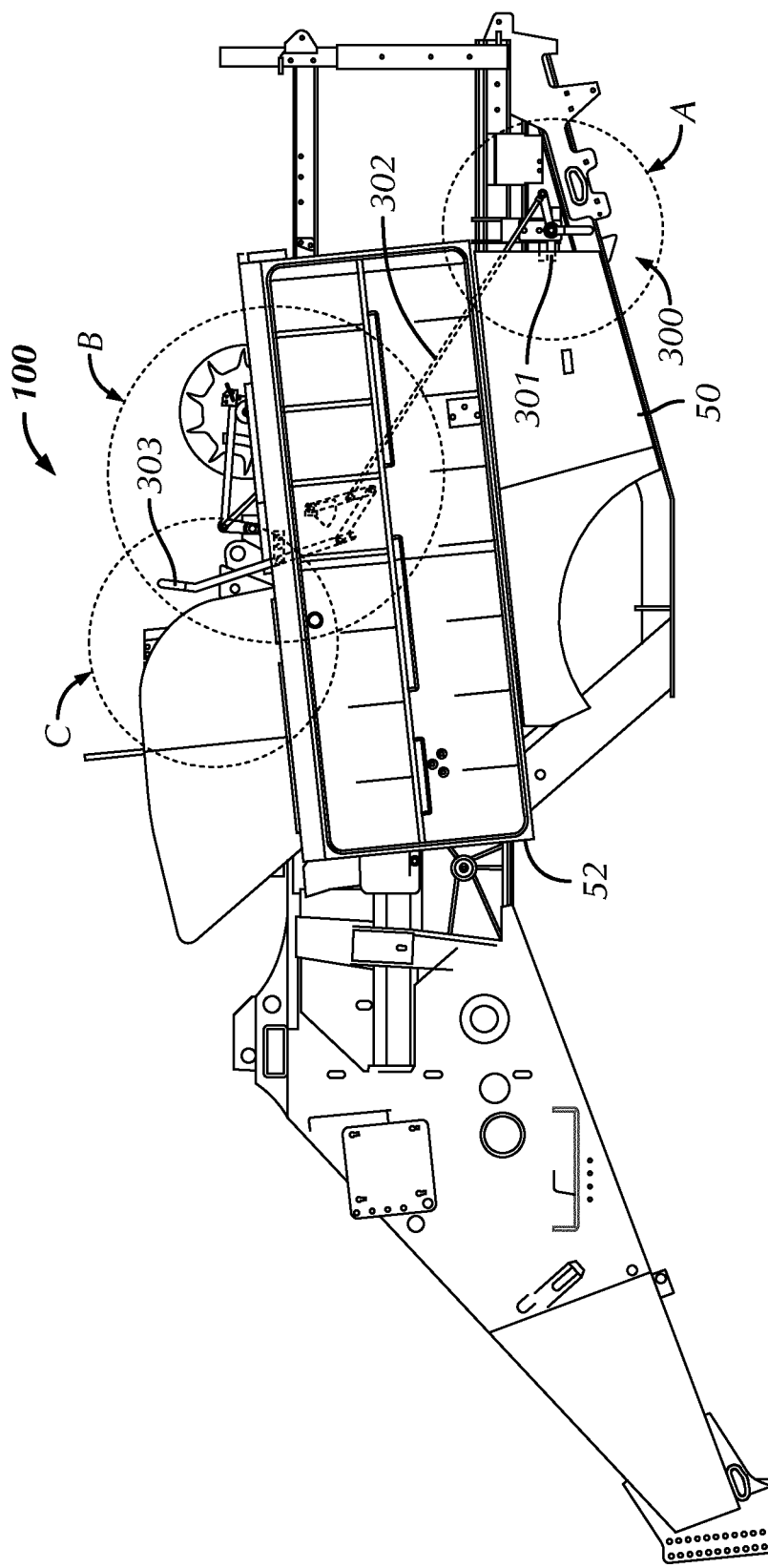
FIG. 6 schematically illustrates a side view of a baler provided with a knotter and safety system in accordance with particular embodiments of the present invention.
Figure 7:
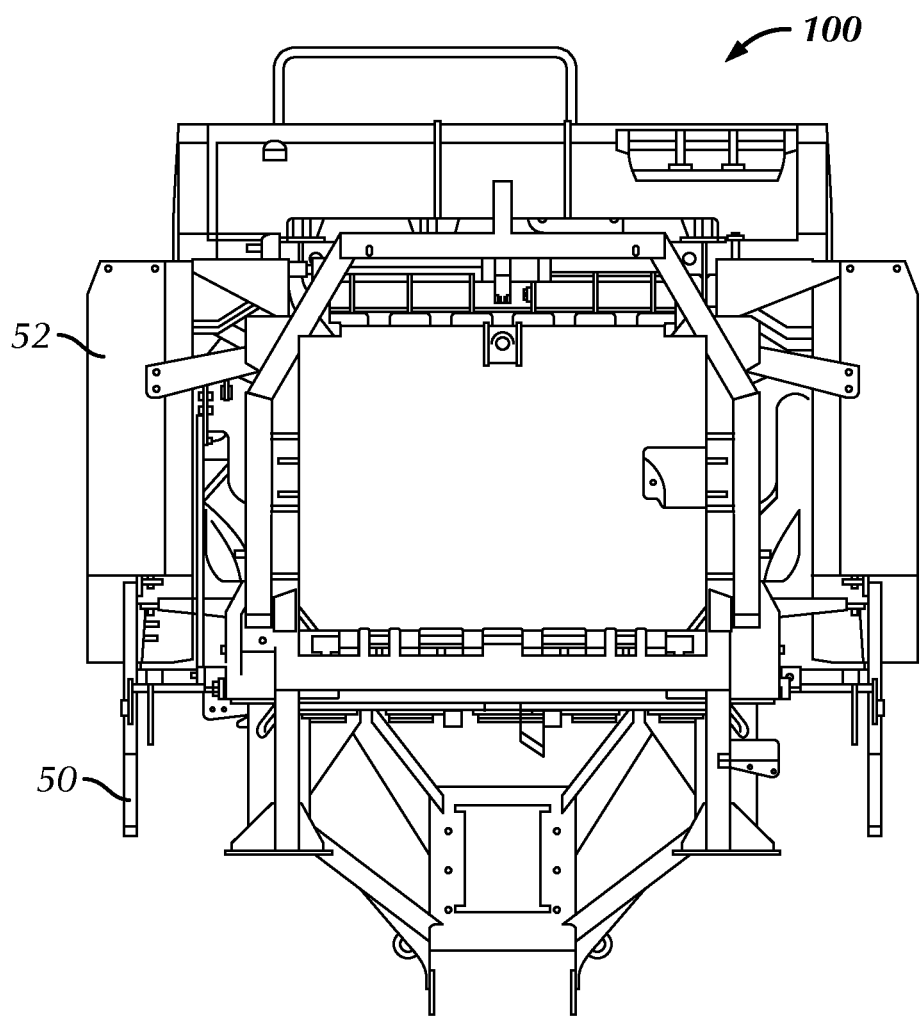
FIG. 7 schematically illustrates a rear view of the baler of FIG. 6.
Figure 8:
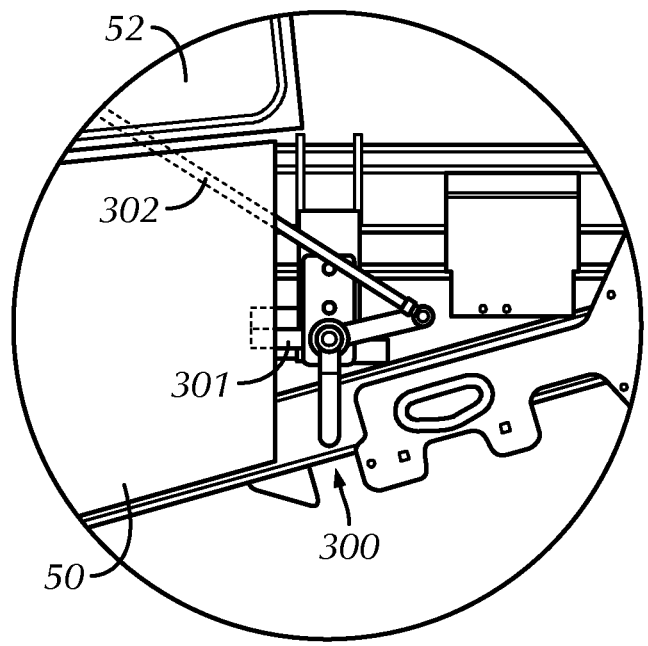
FIG. 8 and FIG. 9 show details of a handle locking or unlocking, respectively, a cover of the baler of FIG. 6.
Figure 9:
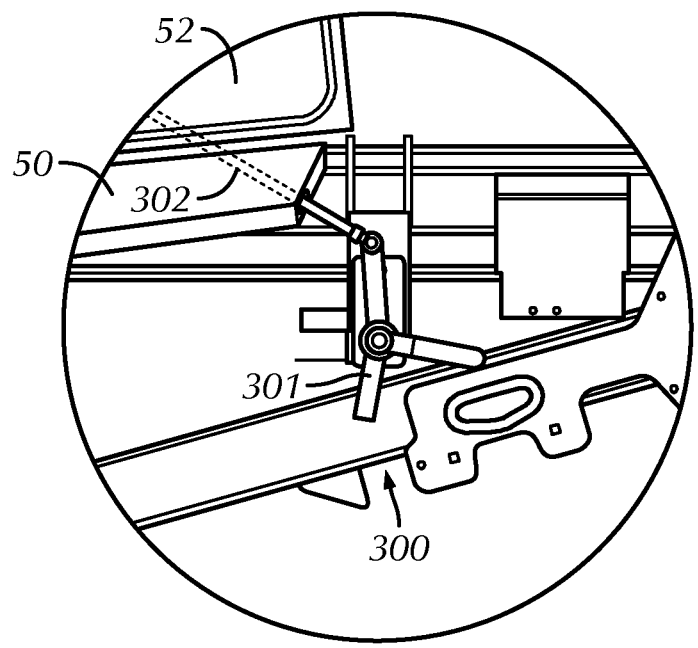
Figure 10:
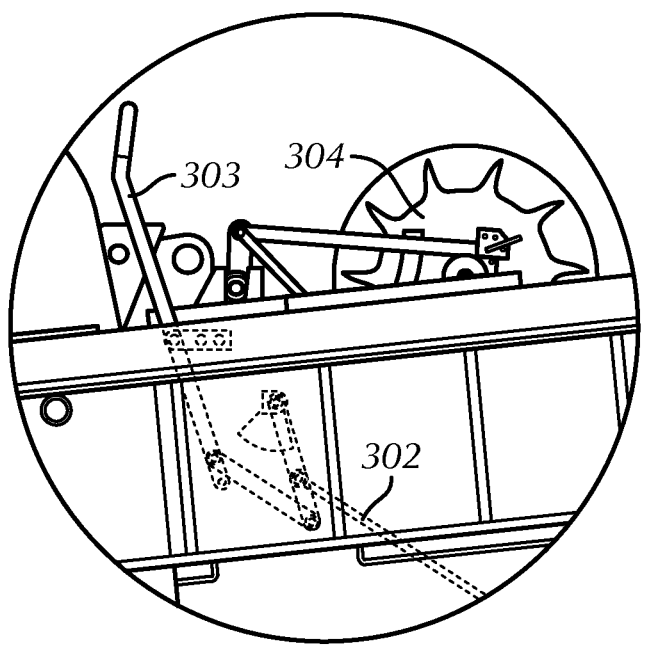
FIG. 10 and FIG. 11 show details of a stopper bar locking or unlocking, respectively, a trip mechanism of the baler of FIG. 6 for actuating the knotter system.
Figure 11:
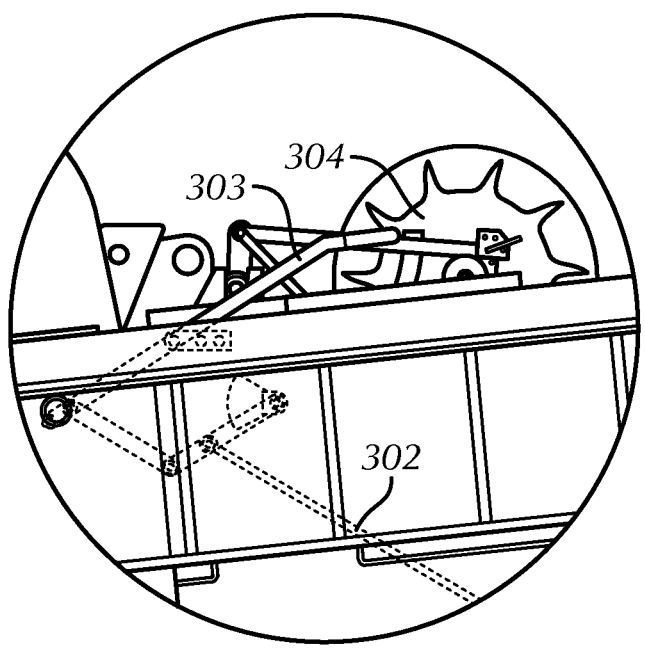
Figure 12:
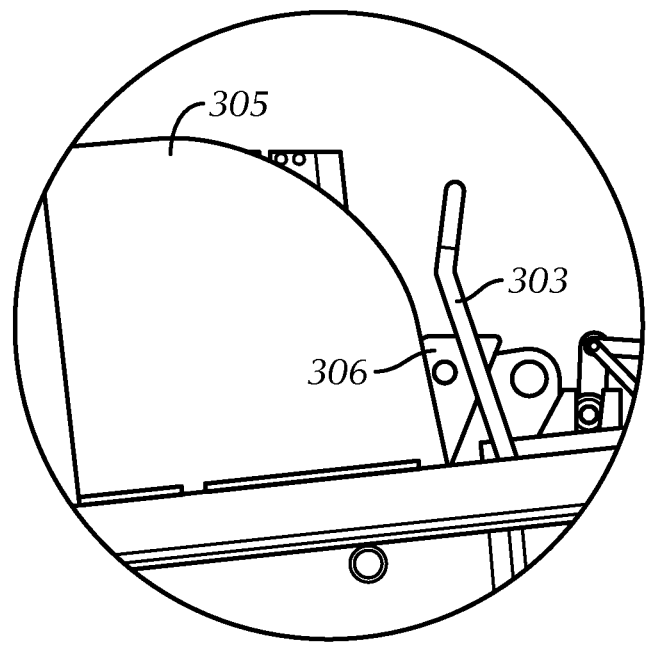
FIG. 12 and FIG. 13 show details of a second cover being blocked or unblocked, respectively, for movement, depending on the position of the handle locking or unlocking the first cover.
Figure 13:
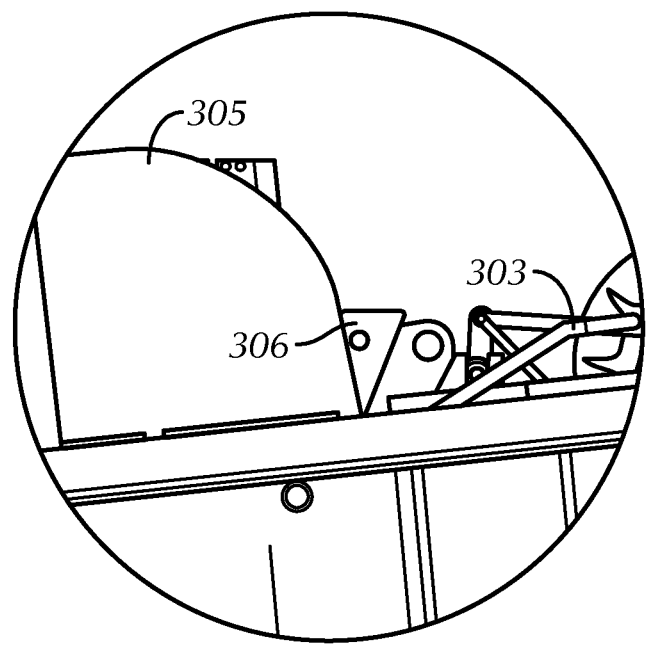

FIG. 6 schematically illustrates a baler 100 provided with a knotter 20 with a safety means 80 according to embodiments of the present invention. In FIG. 6, the baler 100 is illustrated in side view, with a closed cover 50 (cover in first covering position). The same baler 100 with closed cover 50 is illustrated in rear view in FIG. 7. The safety means 80 in this embodiment is a mechanical means, comprising a handle 300 for fixing the cover 50 in its first covering position. Hereto, an arm 301 of the handle 300 may engage with a co-operating protrusion on the cover 50, e.g. a hook, for example at the inner side of the cover 50. The handle 300 is connected to a lever 302, which at its other end is operatively connected to a stopper bar 303. When the handle 300 is brought from a first position where the cover 50 is in its first covering position, to a second position where the cover 50 is released and can be brought in its second uncovering position, as can be seen from comparing FIG. 8 and FIG. 9, the lever 302 makes a corresponding movement. This movement will actuate the stopper bar 303, as can be seen from comparing FIG. 10 and FIG. 11. This stopper bar 303, by its movement driven by the lever 302, locks the trip mechanism 304, thus preventing the knotter mechanism from being actuated. At the same time, by actuating the stopper bar 303 for locking the trip mechanism 304, a knotter shield plate 305, which previously was held in place by the stopper bar 303 blocking a plate 306, can now be opened, thus providing access to the knotter mechanism. This can be seen from a comparison of FIG. 12 and FIG. 13.

In an alternative embodiment (not illustrated in the drawings) the safety means 80 comprises a sensor, sensing a change of the position of the first cover 50 and providing corresponding sensor signals, and actuators, steered by the sensor signals, operatively connected to the driver. In an embodiment thereof the actuator may be hydraulic. In alternative embodiments, the actuator may be pneumatic.

The invention claimed is:
1. A knotter for an agricultural baler, comprising:
   a knotting system with a frame and first and second movable parts adapted for moving while binding a bale;
   a driver operatively connected to the first and second movable parts for arranging a movement of the first and second movable parts;
   a first cover pivotably connected to the frame and associated with the first movable part, the first cover having a covering position wherein the first cover at least partly covers the first movable part, and an uncovering position wherein the first cover no longer covers the first movable part;
   a second cover pivotably connected to the frame, associated with the second movable part and having a covering position wherein the second cover at least partly covers the second movable part, and an uncovering position wherein the second cover no longer covers the second movable part; and
   a safety mechanism operatively connected to the driver, the first cover and the second cover by a lever, such that a positioning of the lever stops movement of the first movable part and the second movable part;
   wherein the second cover is positioned opposite to the first cover relative to the lever and is positioned in the second cover uncovering position only after the first cover is positioned in the first cover uncovering position.

2. The knotter according to claim 1, wherein the first cover covers the first and second movable parts of the knotting system.

3. The knotter according to claim 1, wherein the driver comprises a controller for controlling an operation of the knotting system by allowing movement of first and second movable parts of the knotting system when a bale reaches a desired length for being bound by the knotting system, wherein the safety mechanism is adapted for stopping movement of the first and second movable parts by interrupting the controller when the first cover is or is enabled to go in the first cover uncovering position.

4. The knotter according to claim 1, wherein the driver comprises a rotatable shaft configured for providing power for moving the first and second movable parts, wherein the safety mechanism is adapted for stopping movement of the first and second movable parts by disconnecting the rotatable shaft from the first and second movable parts when the first cover is in the first cover uncovering position or is enabled to go in the first cover uncovering position.

5. The knotter according to claim 1, wherein the safety mechanism comprises a locked position which disables movement of the first cover from the first cover covering position but allows operation of the driver, and an unlocked position, allowing the first cover to move from the first cover covering position to the first cover uncovering position but simultaneously disables the driver such that the first and second movable parts stop moving.

6. The knotter according to claim 5, wherein the safety mechanism comprises a handle for locking the first cover in the first cover covering position, the handle connected to the lever and a lock, the lock configured to lock the driver.

7. The knotter according to claim 1, wherein the safety mechanism comprises a sensor for generating a sensor signal upon sensing a change in position of the first cover, and actuators, steered by the sensor signal, operatively connected to the driver.

8. The knotter according to claim 7, wherein the actuators are hydraulic actuators.

9. The knotter according to claim 7, wherein the actuators are pneumatic actuators.

10. A baler, comprising:
a bale-forming chamber and a knotter operatively connected to the bale-forming chamber;
the knotter comprising:
a frame;
first and second movable parts adapted for moving while binding a bale;
a driver operatively connected to the first and second movable parts for arranging movement of the first and second movable parts;
a first cover pivotably connected to the frame and associated with the first movable part, the first cover having a covering position wherein the first cover at least partly covers the first movable part, and an uncovering position, wherein the first cover no longer covers the first movable part;
a second cover pivotably connected to the frame, associated with the second movable part and having a covering position wherein the second cover at least partly covers the second movable part, and an uncovering position wherein the second cover no longer covers the second movable part; and
a safety mechanism operatively connected to the driver, the first cover and the second cover by a lever, such that a positioning of the lever stops movement of the first movable part and the second movable part;
wherein the second cover is positioned opposite to the first cover relative to the lever and is positioned in the second cover uncovering position only after the first cover is positioned in the first cover uncovering position.

11. The baler of claim 10, wherein the driver comprises a controller for controlling a knotting system by allowing movement of the first and second movable parts when a bale reaches a desired length for being bound by the knotting system, wherein a mechanical trip mechanism is adapted for stopping movement of the first and second movable parts by interrupting the controller when the first cover is or is enabled to go in the first cover uncovering position.

12. A baler, comprising:
a bale-forming chamber and a knotter operatively connected to the bale-forming chamber;
the knotter comprising:
at least one movable part adapted for moving while binding a bale;
a first cover associated with the at least one movable part, the first cover having a covering position wherein the first cover at least partly covers the at least one movable part, and an uncovering position wherein the first cover no longer covers the at least one movable part;
a handle associated with the first cover, the handle being configured to be positioned in a first position in which the first cover is locked in the covering position and a second position in which the first cover is enabled to be positioned in the uncovering position;
a lever operatively connected to the handle;
a stopper bar operatively connected to the lever; and
a mechanical trip mechanism;
wherein actuation of the handle into the second position actuates movement of the lever;
wherein a protrusion on the first cover is configured to engage an arm of the handle when the handle is positioned in the first position;
wherein movement of the lever during actuation of the handle into the second position rotates the stopper bar to engage with and lock the mechanical trip mechanism; and
wherein locking of the mechanical trip mechanism prevents movement of the at least one movable part.

13. The baler according to claim 12, wherein the second cover comprises a knotter shield plate configured to be opened after the mechanical trip mechanism is locked.

14. The baler according to claim 12, further comprising a second cover associated with a second movable part, the second cover having a second cover covering position wherein the second cover at least partly covers the second movable part, and a second cover uncovering position wherein the second cover no long covers the second movable part.

15. The baler according to claim 14, wherein the second cover is enabled to be placed in the second cover uncovering position only after the first cover is placed in the first cover uncovering position.

16. The baler according to claim 13, wherein positioning the handle in the second position in which the first cover is positioned in the first cover uncovering position prevents movement of the at least one movable part and a second movable part.

17. The baler according to claim 12, wherein the protrusion is in the form of a hook.

\* \* \* \* \*